United States Patent [19]

Yamashita et al.

[11] 4,322,839
[45] Mar. 30, 1982

[54] METHOD AND APPARATUS FOR RECORDING AND REPRODUCING INFORMATION ON AND FROM AN OPTICAL DISK

[75] Inventors: Tadaoki Yamashita; Takeo Ohta; Nobuo Akahira; Tatsushi Nakamura; Mutsuo Takenaga, all of Kadoma, Japan

[73] Assignee: Matsushita Electric Industrial Company, Limited, Osaka, Japan

[21] Appl. No.: 69,570

[22] Filed: Aug. 24, 1979

[30] Foreign Application Priority Data

Aug. 25, 1978 [JP] Japan .................. 53-104037

[51] Int. Cl.³ .................. G11B 7/00
[52] U.S. Cl. .................. 369/122; 369/284; 369/288; 346/76 L; 365/113
[58] Field of Search ............ 358/128.5; 179/100.1 G, 179/100.3 V, 100.32; 365/113; 346/76 L; 369/122, 111, 109, 110, 100, 275, 284, 288, 283

[56] References Cited

U.S. PATENT DOCUMENTS

| | | | |
|---|---|---|---|
| 3,430,966 | 3/1969 | Gregg | 179/100.3 V |
| 3,801,966 | 4/1974 | Terao | 365/113 |
| 3,829,622 | 8/1974 | Elliot | 179/100.3 V |
| 3,866,238 | 2/1975 | Monroe | 346/76 L |
| 3,868,651 | 2/1975 | Ovshinsky | 365/113 |
| 3,971,874 | 7/1976 | Ohta | 346/76 L |
| 3,983,317 | 9/1976 | Gloriosa | 179/100.3 V |
| 4,038,663 | 7/1977 | Day | 179/100.3 V |
| 4,085,423 | 4/1978 | Tsumada | 179/100.3 V |
| 4,118,734 | 10/1978 | Bouwhuis | 179/100.3 V |
| 4,125,860 | 11/1978 | Ishii | 179/100.3 V |
| 4,183,094 | 1/1980 | Keeyer | 365/113 |

FOREIGN PATENT DOCUMENTS

50-46317   12/1975   Japan .................. 346/76 L

OTHER PUBLICATIONS

Electronics; 11/23/78; pp. 75, 76.

Primary Examiner—James W. Moffitt
Assistant Examiner—Alan Faber
Attorney, Agent, or Firm—Lowe, King, Price & Becker

[57] ABSTRACT

The optical density and/or the reflectivity of a recording layer included in an optical disk is selectively changed to record information by irradiation with a semiconductor laser beam, while the recording layer may be covered with a suitable protective film. The thickness of the recording layer is so determined that it is able to record information by means of a continuous wave type semiconductor laser beam, while the optical absorption rate of the recording layer is adjusted by setting the percentages of particular additives. The recorded information may be reproduced by the application of a laser beam, the incident power of which is lower than that of the recording beam, to detect the reflected light.

15 Claims, 9 Drawing Figures

METHOD AND APPARATUS FOR RECORDING AND REPRODUCING INFORMATION ON AND FROM AN OPTICAL DISK

FIELD OF THE INVENTION

This invention generally relates to a method and apparatus for optically recording and reproducing information such as video signals or audio signals, on and from a recording medium.

BACKGROUND OF THE INVENTION

As a conventional method of optically recording and reproducing consecutive signals such as video signals or audio signals on an optical disk, it is known to record information on the disk by making a mechanical convexo-concave pattern and to reproduce the recorded information be detecting the convexo-concave pattern using the interference of reflected light from the recesses and the convex portions. In order to produce a master disk in accordance with the above mentioned conventional method, a substrate disk is coated with a photoresist layer, and then a laser beam which is focussed to be a narrow beam, and which is modulated with an input recording signal is incident on the disk. After this process, the regions of the photoresist which have been irradiated with a laser beam are removed by etching to form a convexo-concave pattern on the disk. The above mentioned conventional method of recording and reproducing information is not practical for home use since it includes complicated steps in recording. Especially, the necessity of the etching process constitutes an obstacle in the application of the method into home use. Furthermore, such a disk cannot be covered by a suitable protective film or layer prior to recording since deformation has to be made to perform recording. Accordingly, it is difficult to handle such an uncovered disk at home.

According to another conventional method of recording information on a disk by a laser beam, with a substrate disk coated with a metal, such as bismuth or a semimetal by vaporization, given portions of the metallic film are melted or holes are made in the metallic film by evaporating the same by the heat applied by an Ar laser incident ray. This method also has a drawback that a protective surface layer cannot be provided since the film made by vapour coating has to be deformed, while it is required to use a laser the output power of which is relatively high.

Recently, amorphous chalcogenides are given attention as an optical recording material. Although holograph recording by means of an Ar laser beam on amorphous chalcogenides has been attempted, the application of the amorphous chalcogenides to video disks using a semiconductor laser has not yet been introduced.

A remarkable progress has been made recently, in connection with a semiconductor laser and as the result of the progress, it is now possible to manufacture a semiconductor laser the life time of which is over 1,000 hours when used under the condition of continuous oscillation with the output power between 10 and 40 milliwatts. However, even though such an improved semiconductor laser is used, it has been still difficult to record information, such as video signals, on an optical disk immediately inasmuch as a suitable structure of an optical disk which matches the characteristics of consecutive wave type semiconductor laser has not yet been developed.

SUMMARY OF THE INVENTION

The present invention has been developed in order to provide a practical method and apparatus for optically recording and reproducing information on a disk-like recording medium by solving the problems inherent to the conventional methods and apparatus.

It is, therefore, a primary object of the present invention to provide a method and apparatus for optically recording and reproducing information on and from a disk-like recording medium by means of a continuous wave type semiconductor laser beam.

Another object of the present invention is to provide a method and apparatus for optically recording and reproducing information on and from a disk-like recording medium, in which a disk having a protective cover can be used.

According to the main feature of the present invention, a new structure of a recording optical disk is introduced so that a continuous wave type semiconductor laser can be used as the source of the recording light beam. During recording, geometric deformation does not occur in a recording layer included in the disk, while the optical density or the reflectivity at portions which receive the laser beam is changed to write information thereon. Since no mechanical or geometrical deformation occurs in the recording layer, the recording layer may be coated with a suitable protective layer resulting in an easy handling of a disk.

In order to record information properly, the material of the recording layer as well as the thickness of the same has to be determined carefully. The inventors of the present invention have found the most suitable ranges for the thickness of the recording layer and the optical absorption rate of the recording layer, which will be described in detail hereinlater in this specification.

BRIEF DESCRIPTION OF THE DRAWINGS

These and other objects and features of the present invention will become more readily apparent from the following detailed description of the preferred embodiments taken in conjunction with the accompanying drawings in which.

DETAILED DESCRIPTION OF THE PREFERRED EMBODIMENT

Figure 1:
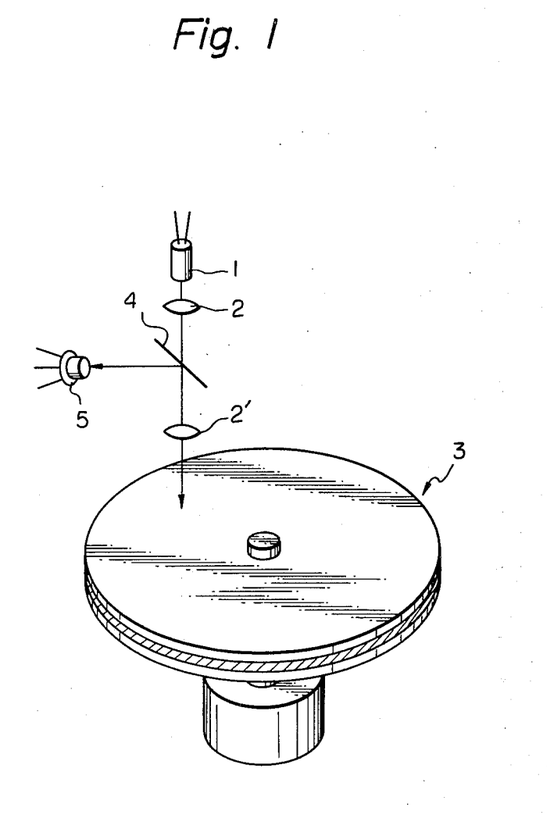
FIG. 1 is a schematical diagram of the apparatus for optically recording and reproducing information according to the present invention.

Reference is now made to FIG. 1 which shows a schematical diagram of an embodiment of the apparatus for recording and reproducing video signals according to the present invention. The apparatus comprises a semiconductor laser 1, a first lens 2, a second lens 2', an optical disk 3, a half mirror 4 and a photodetector 5. The disk 3 is arranged to spin by means of a motor (no numeral). The semiconductor laser 1 emits laser light in the form of a beam, which is illustrated by a solid line in the drawing, and the laser beam is incident on the disk 3 through the first and second lenses 2 and 2' and the half mirror 4. These first and second lenses 2 and 2' are used to focus the laser beam on a recording layer disposed in the disk 3 so that a spot of light, the diameter of which is approximately $1\mu$, is made on the recording layer. The intensity of the laser beam is modulated in accordance with an input signal, which is the object of a recording, by a suitable modulator (not shown) before the laser beam is emitted from the semiconductor laser 1. By the application of such a modulated laser beam onto the recording layer, the objective recording signal is recorded or written on the recording layer in the form of a pattern of light and shade since the disk 3 including the recording layer is spinning at a predetermined rotational speed. With this operation, a plurality of spiral recording tracks will be made on the recording layer to complete a recording of an input information.

The recording information is retrieved by illuminating the disk 3 (actually the recording layer) with a somewhat less intense beam and then detecting the light reflected back from the disk 3. In order to achieve the above described reproducing or reading process, the same optical system used for recording is again used. A laser beam the intensity of which is lower than that during recording, is emitted from the semiconductor laser 1 and is focussed by the first and second lenses 2 and 2' on the recording layer. This laser beam used for reproducing is, of course, unmodulated. The incident beam is reflected by the recording layer and thus the unmodulated beam is modulated by the prerecorded signal pattern of light and shade during reflection. The reflected beam is now focussed by the second lens 2' and is incident on the half mirror 4 so that the reflected beam incident on the half mirror 4 is reflected by the half mirror 4 to change the transmission path and then collected by the photodetector 5. Upon receiving the reflected beam, the photodetector 5 generates an output signal including the recorded and then reproduced information.

Figure 2:
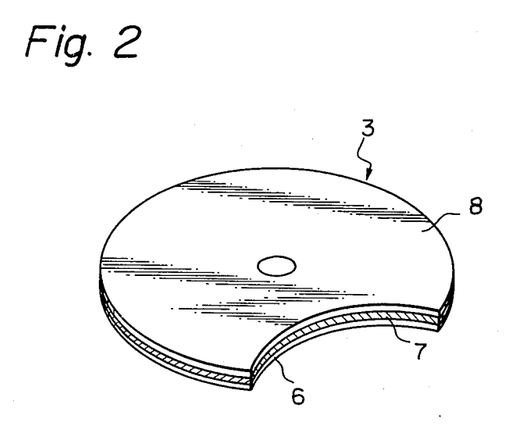
FIG. 2 is a perspective view of the disk shown in FIG. 1.

FIG. 2 illustrates a perspective view of the disk 3 wherein a cross-sectional view is partly shown. The disk 3 comprises a transparent substrate 6 which is made of a resin, a recording layer 7, and an overcoat 8 for protecting the surface of the recording layer 7. The overcoat 8 is tightly placed on the surface of the recording layer 7.

Figure 3:
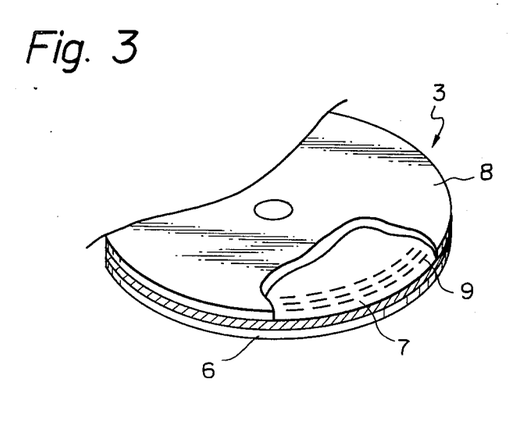
FIG. 3 is a perspective view of the disk shown in FIG. 1, showing that recording information has been written on the recording layer included in the disk.

While FIG. 2 shows the structure of the disk 3, FIG. 3 illustrates a disk 3 under a condition that information has been recorded on the recording layer 7. A reference numeral 9 indicates a shade portion made on the recording layer 7 by the aforementioned recording technique.

As the material of the recording layer 7 a thin film made of a suboxide or a chalcogenide is used. With a laser beam incident on the recording layer 7, the energy of the light is absorbed by the recording layer 7 in the form of heat so that the temperature at a portion on which the beam has been applied, increases resulting in thermal transformation of the portion. Because of this thermal transformation, the optical density and/or the reflectance (reflectivity) of the irradiated portion changes.

As described hereinabove, a suboxide or a chalcogenide is used as the material of the recording layer 7. A suboxide of a tellurium oxide is known and is disclosed in a Japanese Patent Provisional Publication No. 50-46317. In the preferred embodiments according to the present invention $TeO_x$ $(0<x<2)$ including 5 percent PbO and 5 percent $V_2O_5$ is used as the suboxide and GeTeS is used as a chalcogenide.

Figure 4A:
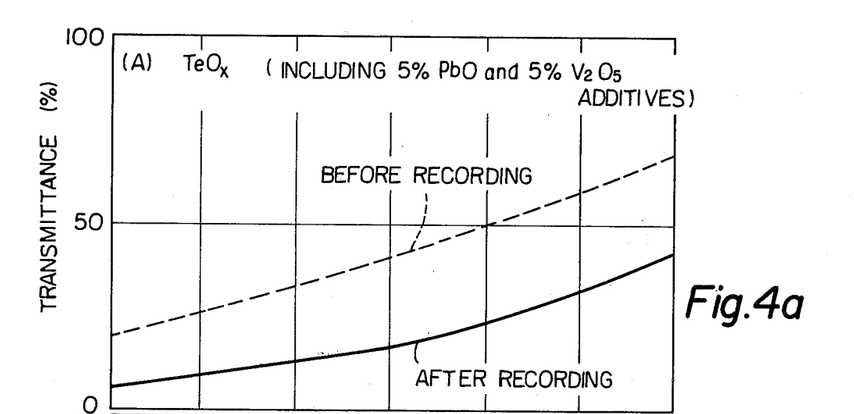
FIGS. 4(a) and 4(b) include, respectively, two graphs showing the transmittances of two recording layers which are made of two different materials.
Figure 4B:
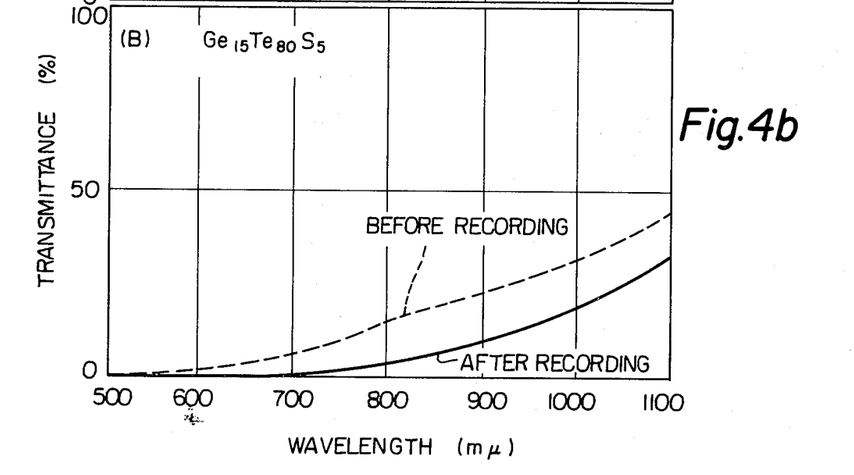

Reference is now made to FIG. 4 which includes first and second graphs A and B which respectively include spectral transmittance curves in infrared region. The first graph A is made when $TeO_x$ $(0<x<2)$ including 5 percent PbO and 5 percent $V_2O_5$ additive is used as the material of the recording layer 7 of the disk 3. From graph A it will be understood that the transmittance is between 40 and 50 percent before recording with respect to a wavelength range from 700 to 900 m$\mu$ (millimicrons) which wavelength range corresponds to that of semiconductor laser light. After recording the transmittance drops to a value between 20 and 25 percent. The reflectance is not plotted in graphs since the measurement of spectrum in connection with reflectance is difficult. However, it was ascertained that the reflectance with respect to a wavelength of 800 m$\mu$ before recording is 8 percent and the reflectance after recording is increased to as much as 17 percent. The second graph B is made when GeTeS is used as the material of the recording layer 7 of the disk 7. It will be understood from the graph B that the transmittance is decreased when measured after recording compared to that before recording. The reflectance of the recording layer made of GeTeS with respect to a wavelength of 800 m$\mu$ is 30 percent before recording and is 38 percent after recording.

As will be described in detail hereinlater, recording is performed by exposing the recording layer 7 to a relatively narrow pulse of high intensity light, derived from for instance, a semiconductor laser or a flash light source. It is to be noted that geometric deformation on the surface of the recording layer 7 does not occur when information is recorded thereon, while an optical change merely occurs in the recording layer 7. As the result of recording according to the present invention, a precise signal pattern, as shown in FIG. 3, is made.

The function of the semiconductor laser 1 will be described in detail hereinbelow. An improved semiconductor laser has been developed recently wherein the emitted beam is of continuous waves and the emission spectral pattern is of simple single mode, i.e. monochromatic. The emitted laser beam tends to slightly widen and therefore, the emitted beam is focussed by means of a lens system. It is possible to narrow the beam to approximately 1 to $2\mu$ according to nowaday technique. Since the optical output power of a semiconductor laser has a limit, it is necessary to focus the beam to such an extent to give sufficient energy to the recording layer 7. In other words, if the laser beam were not focussed, the light intensity would be insufficient to perform recording. As is well known, the light intensity per a unit area is inversely proportional to the square of the diameter of the beam. For these reasons, the semiconductor laser beam has to be narrowed within 2μ, and this is a precondition for the following description.

The optical recording (writing) method according to the present invention will be described hereinbelow. The optical output power of a semiconductor laser of continuous wave type is lower than that of gas lasers and semiconductor lasers of pulse output type. Therefore, it is difficult to properly record information onto a disk by means of a semiconductor laser of continuous wave type even though a suboxide or a chalcogenide which respectively have high recording sensitivity, unless various conditions have to be suitably determined. These conditions are as follows:

The optical energy received by a micro area of the recording layer 7 varies as a function of the rotational speed of the disk 3 when the intensity of the laser beam is constant. Namely, when the disk 3 spins at a high speed, the incident beam travels along the surface of the recording layer 7 at a high speed relative to the disk 3 so that the amount of light, i.e. the optical energy received by unit area, decreases as compared to the case of low rotational speed of the disk 3.

Figure 5:
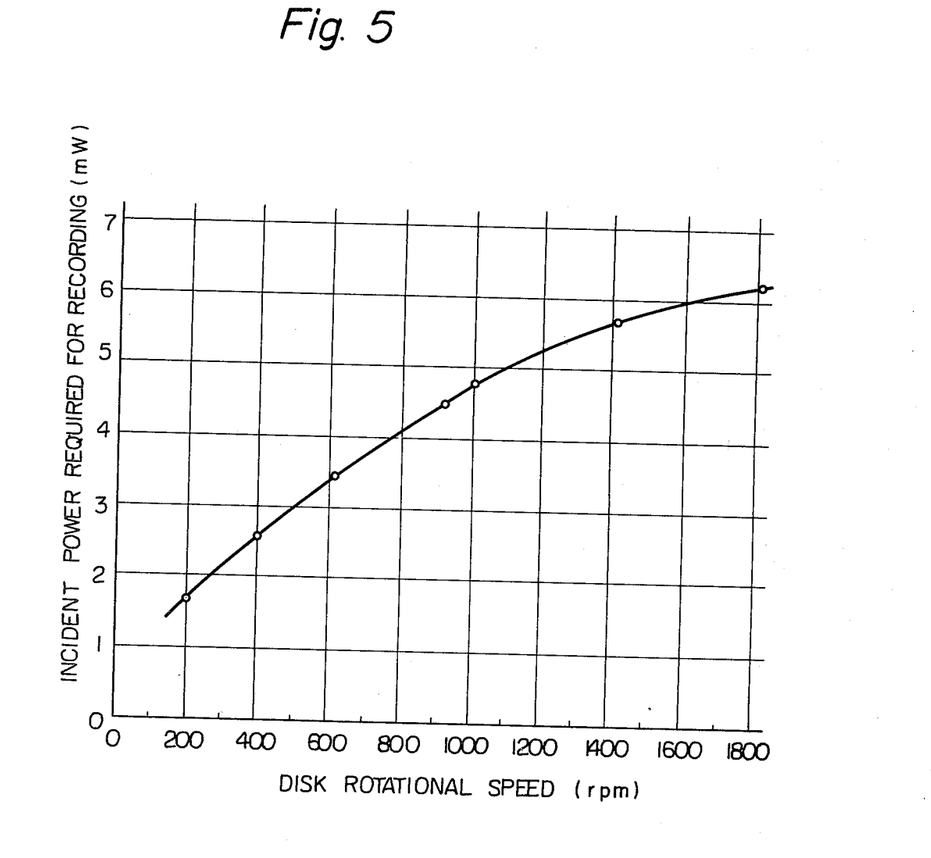
FIG. 5 is a graph showing the incident power required for recording with respect to the rotational speed of the disk.

FIG. 5 is a graph showing incident power required for recording with respect to the rotational speed of the disk 3. The datum of FIG. 5 is obtained under the condition that the diameter of an optical spot made on the surface of the recording layer 7 is 1.2μ and the position of the recording track on the recording layer 7 is 10 cm away from the center of the disk 3. Therefore, the relative speed of the optical spot with respect to the recording layer 7 is 9.4 m/sec with a rotational speed of the disk 3 of 900 rpm and is 18.8 m/sec with a rotational speed of the disk 3 of 1800 rpm. As the material of the recording layer 7 the aforementioned thin layer made of tellurium oxide is used and the thickness of the recording layer 7 is 0.15 μm, while the optical absorption rate thereof is 50 percent. Although the beam power incident on the recording layer 7 is plotted along the vertical axis more power is required for the output of the semiconductor laser 1 due to the transmission loss in the optical system. Namely, since the efficiency of the transmission from the semiconductor laser 1 to the recording layer 7 via the optical system is between 25 percent and 40 percent, the output power of the semiconductor laser 1 has to correspond to 2.5 to 4.0 times the value plotted along the vertical axis of the graph of FIG. 5.

The diameter of an optical spot made on the recording layer 7 has to be determined in view of the rotational speed of the disk 3, the incident power and the frequency of a recording signal inasmuch as there exists a specific relationship among these factors. This relationship is given by the following formula and the relationship defined by the formula has to be satisfied.

$$\omega < \frac{2 \cdot \pi \cdot A \cdot R \cdot 10^4}{2 \cdot f \cdot 60 \cdot 10^6} \ (\mu)$$

wherein

ω(μ) is the diameter of an optical spot made on the recording layer;
A(rpm) is the rotational speed of the optical disk;
R(cm) is the radius of the recording track; and
f(MHz) is the frequency of the recording signal.

In case of recording a video signal the frequency of the recording signal reaches as high as 5 to 10 MHz, and therefore, the rotational speed of the disk 3 may be set at 1800 rpm to record one NTSC frame on a single track and at 900 rpm to record two NTSC frames on a single track assuming that one frame corresponds to 1/30 second. Although the above described values of the rotational speed of the disk 3 is for NTSC television system, the rotational speed of the disk 3 may be set suitably also for other television systems such as PAL.

The reason that the rotational speed of the disk 3 is set at either 1800 rpm or 900 rpm for recording video information under NTSC system is that the matching characteristic in signal processing during still picture reproducing is poor if the number of frames per single track is not an integer, while a higher rotational speed of the optical disk 3 results in the reduction of the recording capacity. For instance, a disk spinning at 3600 rpm, i.e. half frame per a single track, has a recording capacity half of that of a disk spinning at 1800 rpm. On the other hand, with a disk spinning at a low speed, such as 450 rpm, i.e. four frames per a single track, it is quite difficult to separate signal bits by using an optical spot of 1.2μ derived from a semiconductor laser since the diameter of the spot is too large.

From the foregoing it will be understood that the most suitable rotational speed of the optical disk 3 is either 1800 rpm or 900 rpm so that high speed recording and reproducing are respectively performed, while the matching characteristic in signal processing is maintained at a desired level. Although the above mentioned relationship among the various factors ω, A, R and f has been made to record video signals, when it is intended to record audio signals, the formula is easily satisfied by suitably determining the factors thereof since the frequency of the recording signal is extremely low compared to that of the video signals. In this case as will be seen in the graph, (FIG. 5), the incident power required for recording is about 6 mW at the rotational speed of the optical disk 3 of 1800 rpm. Therefore, when converting this value into the output power of the semiconductor laser 1, it can be said that the output power has to be between 15 and 24 mW. With the rotational speed of the optical disk 3 of 900 rpm, the incident power required for recording is 4.5 mW and therefore, corresponding output power of the semiconductor laser 1 is between 10 and 15 mW. Furthermore, when the optical disk is utilized for recording PCM (pulse code modulated) audio signals, the rotational speed of the disk 3 has to be over 900 rpm. For these reasons, the rotational speed of the optical disk 3 is set at either 900 rpm or 1800 rpm, and the following description will be made under an assumption that the rotational speed of the optical disk 3 is set at either 900 rpm or 1800 rpm.

Another important factor or condition which makes it possible to write information by means of a semiconductor laser beam is the thickness of the recording layer 7. Thicker recording layers require more incident power since the thermal capacity of a recording layer gets higher as the thickness becomes thicker. On the other hand, excessively thin recording layer is not suitable since the optical density does not vary in a desirable wide range.

Figure 6:
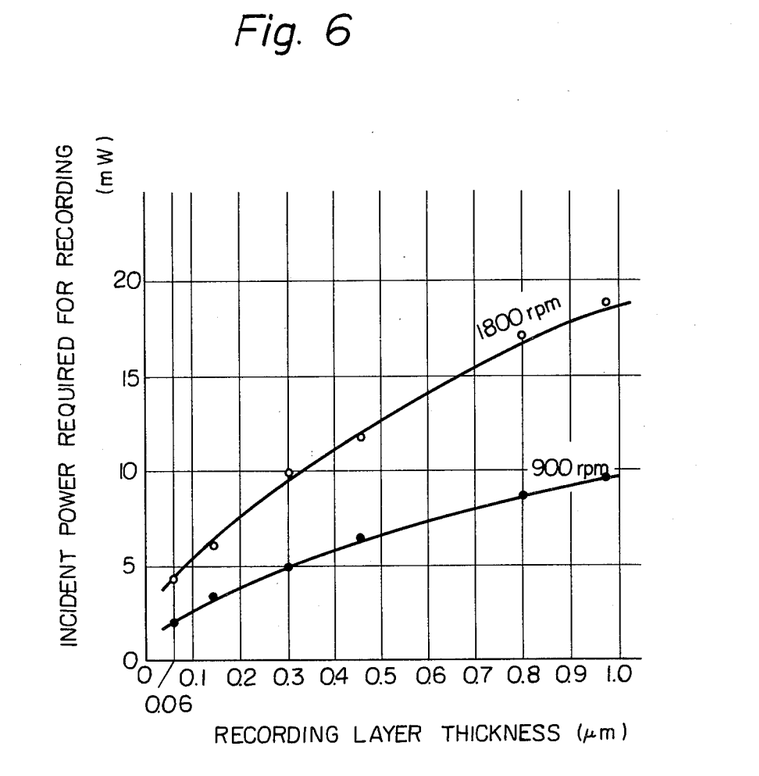
FIG. 6 is a graph showing the incident power required for recording with respect to the thickness of the recording layer.

FIG. 6 is a graph showing the incident power required for recording with respect to the thickness of the recording layer 7, wherein the meaning of the incident power required for recording is that which gives variation in the transmittance by 20 percent, while the diameter of the optical spot is 1.2μ, and the radius of the recording track is 10 cm. The reason that it is necessary to give the optical layer transmittance variation of 20 percent is that an output reproduced signal having a desirable S/N (signal to noise ratio) is obtained when the transmittance varies over a range of 20 percent. The graph of FIG. 6 shows the result of an experiment which is done by using a high-output pulse oscillation type semiconductor laser. When the recording layer thickness is below 0.06μ, the optical density cannot vary in a sufficient range. In this graph two examples under the rotational speeds (1800 rpm and 900 rpm) of the optical disk 3 are respectively shown, by two curves and it will be understood that both curves indicating the incident power required for recording are rising up with a slope which is slightly gentler than in case of a proportional increase. As is plotted along the upper curve, if the thickness of the recording layer 7 is 0.3μ, while the rotational speed of the disk 3 is 1800 rpm, the incident power required for recording is 10 mW, which corresponds to the upper limit of incident power obtained by continuous wave type semiconductor laser. In other words, continuous wave type semiconductor lasers cannot emit a laser beam of sufficient power achieving incident power of over 10 mW when the rotational speed of the optical disk 3 is at 1800 rpm. From the above described experiments, it has been discovered that the thickness of the recording layer has to be set between 0.06μ and 0.3μ when it is intended to utilize a continuous wave type semiconductor laser beam.

The optical absorption rate of the recording layer 7 basically varies in accordance with the thickness of the layer if the material used for the recording layer is the same. However, it is also possible to change the optical absorption rate by varying the components of the recording layer 7. For example, in case of $TeO_x$ the percentages of the additives, i.e. PbO and $V_2O_5$ may be increased to increase the optical absorption rate.

Figure 7:
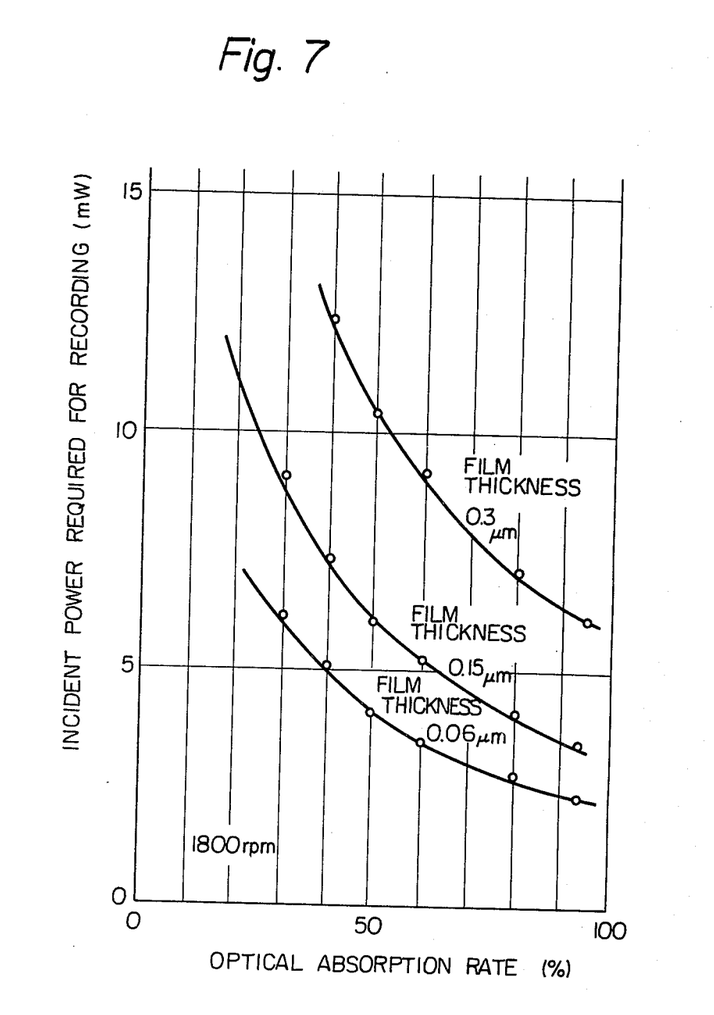
FIG. 7 is a graph showing the incident power required for recording with respect to the optical absorption rate.

FIG. 7 is a graph showing incident power required for recording with respect to the optical absorption rate, wherein the parameter of the graph is the thickness of the recording layer 7. The rotational speed of the optical disk 3 is fixed at 1800 rpm. In this graph of FIG. 7, when the recording layer thickness is 0.3μ, and the optical absorption rate is 50 percent, the incident power required for recording is about 10 mW which corresponds to the semiconductor laser output power between 25 and 40 mW. When the recording layer thickness is 0.15μ, and the optical absorption rate is 50 percent, the incident power required for recording is about 6 mW which corresponds to the semiconductor laser output power range of from 15 to 24 mW. Furthermore, when the thickness of the recording layer is 0.06μ, and the optical absorption rate is 50 percent, the semiconductor laser requires its output power as small as the range from 10 to 16 mW. Of course, as the rotational speed of the optical disk 3 decreases, the output power of the semiconductor laser required for proper recording lowers. From the above, it can be generally said that the absorption rate of the recording layer 7 has to be over 50 percent.

On the other hand, the optical absorption rate of a recording layer 7 cannot be over 95 percent since at least a small amount of light is reflected at the surface of the layer, wherein the reflected light is used to detect the focussing condition. From the above, it will be apparent that the optical absorption rate of the recording layer 7 has to be set between 50 and 95 percent.

Summarizing the conditions required for performing proper recording by way of the irradiation with a continuous wave type semiconductor laser beam on a recording layer, the material of which is such that the optical density and/or the reflectivity thereof varies with the increase in temperature upon receiving the beam thereon, it is necessary to apply an incident beam the power of which is less than 10 mW which corresponds to the semiconductor laser output power range of from 15 to 40 mW. Furthermore, in order to record information by means of such a low incident power, the thickness of the recording layer has to be set at the most suitable value, which is below 0.3μ, while the optical absorption rate of the recording layer has to be over 50 percent.

Hereinabove, the recording operation has been described, and now the method of reproducing the recorded signal pattern will be described. As mentioned hereinbefore, the same optical system may be used for writing information and for reading the recorded information.

Referring to FIG. 1 again, the apparatus shown in the drawing serves as both recording and reproducing apparatus. The photodetector 5 receives a laser beam including recorded and then read information. If the incident power for reading the recorded information were excessively low, the S/N of the reproduced signal would be deteriorated. According to experiments, the output power of the semiconductor laser has to be above 2 mW to obtain a high quality reproduced picture. On the other hand, if the incident power were too high, writing would take place undesirably. In other words, the recording layer 7 is subjected to recording by means of such a laser beam of relatively high intensity. Consequently, the intensity of the beam incident on the recording layer during reproducing should be below a given level. The upper limit of the semiconductor laser output power for reading is, therefore, considered to be 10 mW.

Figure 8:
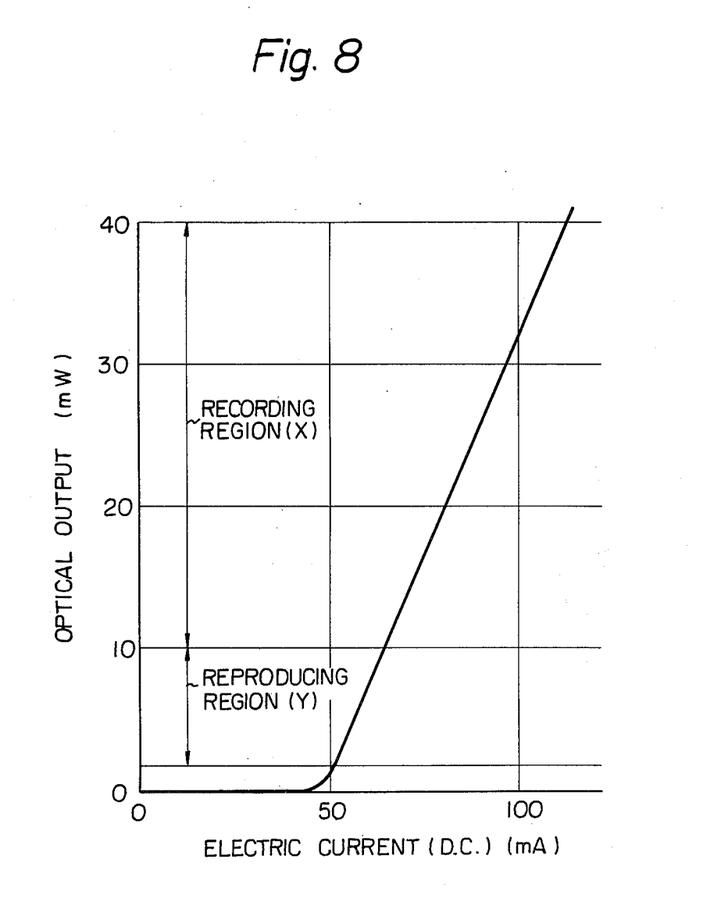
FIG. 8 is a graph showing the optical output of the semiconductor laser shown in FIG. 1 with respect to the electric current flowing therethrough.

FIG. 8 is a graph showing the optical output of the continuous wave type semiconductor laser with respect to the electric current flowing through the semiconductor. The optical output power is plotted along the vertical axis, while the electric current is plotted along the horizontal axis in the graph. The semiconductor laser suddenly starts emitting light with an electric current over 50 mA supplied. The range of the optical output power is divided into two regions X and Y which are respectively referred to as a recording region X and a reproducing region Y. It will be recognized from the graph of FIG. 8 that the optical output between 10 and 40 mW is suitable for the recording region X, while the optical output between 2 and 10 mW is suitable for the reproducing region Y.

From the foregoing, it will be apparent that the present invention provides a practical method and apparatus for recording and reproducing information such as video signals by way of a laser beam emitted from a semiconductor laser which is small in size. Since the disk used in the present invention has a protective surface layer, it is easy to handle disks and thus suitable for home use. Furthermore, it will be apparent for those skilled in the art that many modifications and variations may be made without departing from the spirit of the present invention.

What is claimed is:

1. An apparatus for optically recording on and reproducing information from an optical disk including a recording layer having a thickness from 0.06 to 0.3 micron, and an optical absorption factor from 50 to 95 percent of incident radiation, comprising:

(a) a semiconductor laser for emitting a laser beam which is modulated with an input recording signal;

(b) an optical system for focussing the laser beam emitted from said semiconductor laser;

(c) means for rotating said optical disk at such a speed that said laser beam changes an optical characteristic of said recording layer without geometrically deforming said layer; and (d) a photodetector responsive to a laser beam reflected at or transmitted through said recording layer.

2. An apparatus for optically recording and reproducing information on and from an optical disk as claimed in claim 1, wherein said optical disk further comprises a protective surface layer securely disposed on said recording layer.

3. An apparatus for optically recording and reproducing information on and from an optical disk as claimed in claim 1, wherein said recording layer is made of a suboxide.

4. An apparatus for optically recording and reproducing information on and from an optical disk as claimed in claim 3, wherein said recording layer is made of a tellurium oxide including 5 percent PbO and 5 percent $V_2O_5$.

5. An apparatus for optically recording and reproducing information on and from an optical disk as claimed in claim 4, wherein said tellurium oxide is $TeO_x$; wherein $0 < x < 2$.

6. An apparatus for optically recording and reproducing information on and from an optical disk as claimed in claim 1, wherein said recording layer is made of a chalcogenide.

7. An apparatus for optically recording and reproducing information on and from an optical disk as claimed in claim 6, wherein said recording layer is made of GeTeS.

8. An apparatus for optically recording and reproducing information on and from an optical disk as claimed in claim 7, wherein the mixing ratio of the components of said recording layer is expressed in terms of $Ge_{15}Te_{80}S_5$.

9. An apparatus for optically recording and reproducing information on and from an optical disk as claimed in claim 1, wherein said optical system comprises a plurality of lenses and a half mirror.

10. A method of optically recording and reproducing information on and from an optical disk by means of a laser beam, said optical disk including a recording layer having a thickness from 0.06 to 0.3 micron, and an optical absorption factor from 50 to 95 percent of incident radiation, said method comprising the steps of:

(a) emitting a laser beam, which is modulated with input recording information, from a semiconductor laser;

(b) focussing said laser beam;

(c) irradiating said recording layer with the focussed laser beam to write said information thereon by selectively changing the optical density and/or the reflectivity of the material of said recording layer, said disk being rotated at such a speed that said laser beam changes an optical characteristic of said recording layer without geometrically deforming said layer;

(d) emitting an unmodulated laser beam from said semiconductor laser, the intensity of said unmodulated laser beam being lower than that of said modulated beam;

(e) focussing said unmodulated laser beam;

(f) irradiating said recording layer with said unmodulated laser beam, which has been focussed, to obtain a laser beam modulated by the recorded information, said disk being rotated at such a speed that said unmodulated laser beam changes an optical characteristic of said recording layer without geometrically deforming said layer; and (g) detecting said laser beam modulated by said recorded information.

11. A method of optically recording and reproducing information on and from an optical disk as claimed in claim 10, wherein the output power of said semiconductor laser is between 10 and 40 milliwatts during recording, and is between 2 and 10 milliwatts during reproducing.

12. A method of optically recording the reproducing information on and from an optical disk as claimed in claim 10, wherein said laser beam is focussed to make a spot having a diameter of 1.2 microns.

13. A method of optically recording and reproducing information on and from an optical disk as claimed in claim 10, wherein the transmittance of said recording layer is selectively changed by at least 20 percent when recording has been performed.

14. A method of optically recording and reproducing information on and from an optical disk as claimed in claim 10, wherein said optical disk is rotated at either 1800 or 900 rpm.

15. A method of optically recording and reproducing information on and from an optical disk as claimed in claim 10, wherein the following formula is satisfied:

$$\omega < \frac{2 \cdot \pi \cdot A \cdot R \cdot 10^4}{2 \cdot f \cdot 60 \cdot 10^6} \ (\mu)$$

wherein $\omega(\mu)$ is the diameter of an optical spot made on said recording layer;

A(rpm) is the rotational speed of the optical disk;

R(cm) is the radius of the recording track; and f(MHz) is the frequency of the recording signal.

* * * * *